Sept. 30, 1969        R. K. GETMAN        3,469,606

MULTI-PORT ROTARY AND RECIPROCATING FLUID CONTROL VALVE

Filed July 13, 1967        4 Sheets-Sheet 1

INVENTOR.
RONALD K. GETMAN

BY Carlsen, Carlsen & Sturm

ATTORNEYS

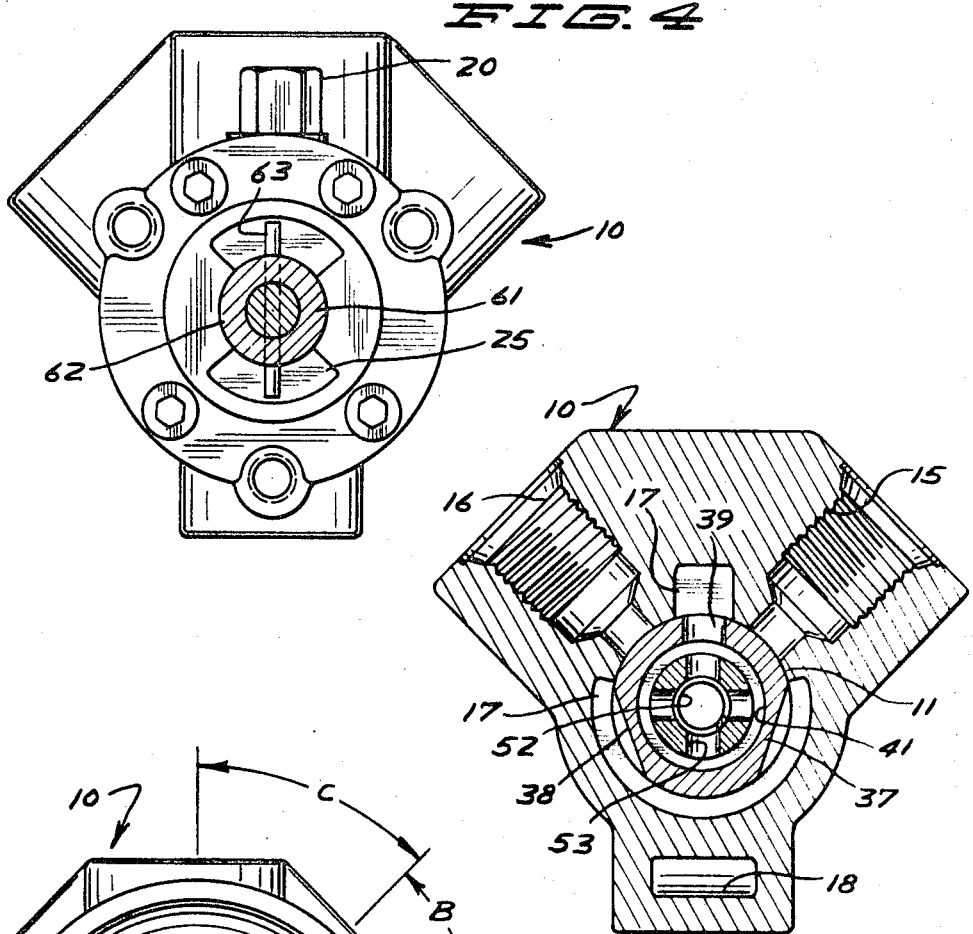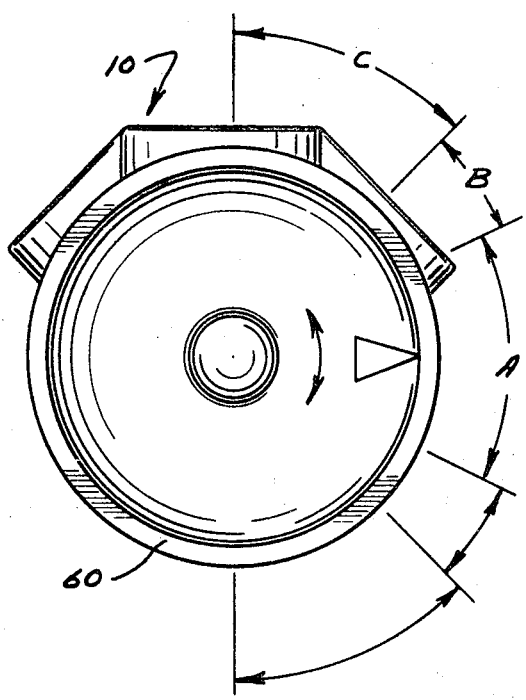

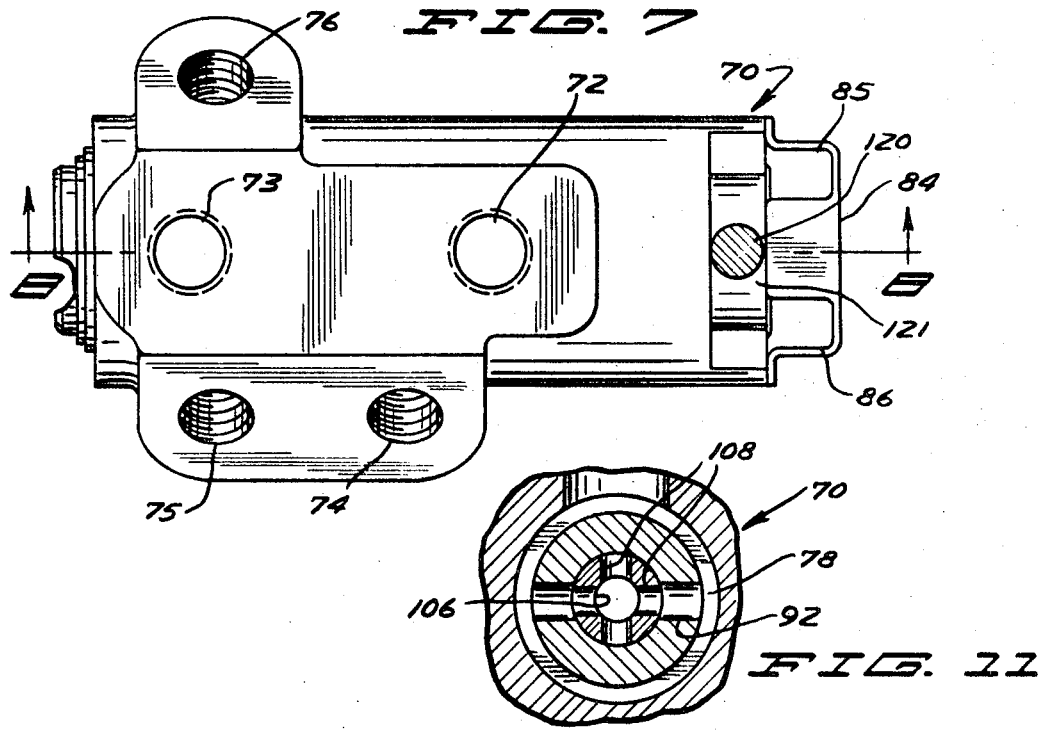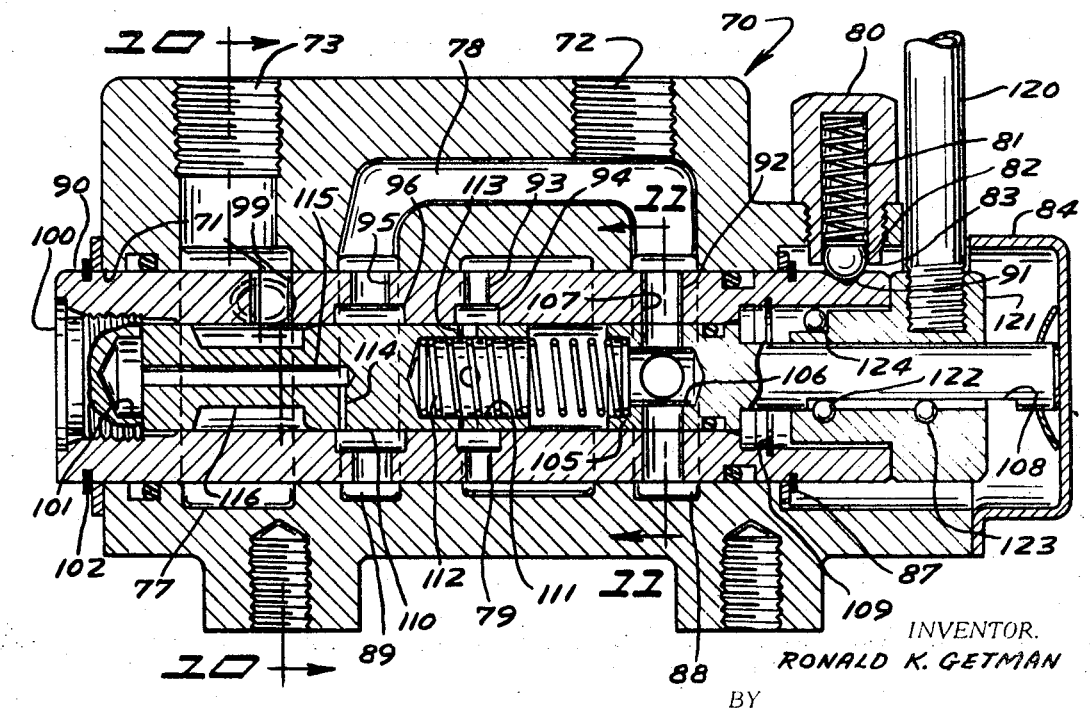

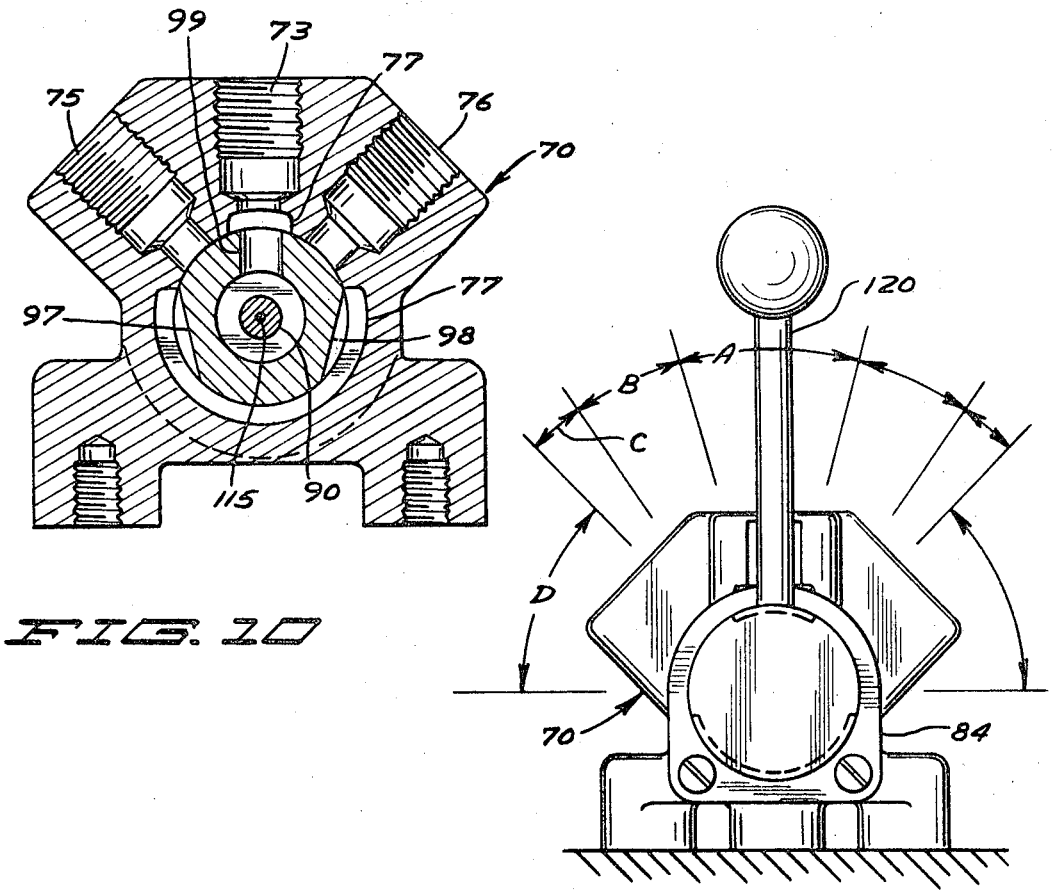
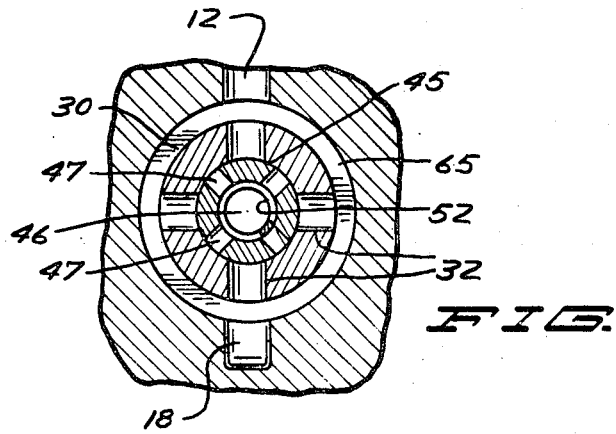

United States Patent Office 3,469,606
Patented Sept. 30, 1969

3,469,606
MULTI-PORT ROTARY AND RECIPROCATING FLUID CONTROL VALVE
Ronald K. Getman, Minnetonka Village, Minn., assignor to Gresen Manufacturing Company, Minneapolis, Minn., a corporation of Minnesota
Filed July 13, 1967, Ser. No. 653,115
Int. Cl. F16k *11/12*
U.S. Cl. 137—636.4                               10 Claims

ABSTRACT OF THE DISCLOSURE

A rotary fluid valve incorporating selective and reversible modes of operation for controlling the direction and speed of operation of a fluid motor and including flow dividing means for operation in a fluid control system in which the source of fluid may be further utilized in the operation of one or more other fluid utilization devices simultaneously with operation of the valve and its associated fluid operated device.

---

This invention relates generally to fluid valves and is more particularly directed to a rotary fluid valve for controlling the speed and direction of a reversible fluid operated motor.

It is therefore an object of my invention to provide an improved directional and speed ocntrol valve for use in systems utilizing fluid under pressure as a source of motive energy.

Another object of my invention is to provide an improved control valve for use in fluid operated systems wherein a plurality of fluid operated devices are operated from a single source of fluid under pressure.

A still further object of my invention is to provide an improved fluid valve for operating reversible fluid utilization devices.

A still further object of my invention is to provide an improved multiposition selective fluid control valve that may be utilized to control the direction of flow of fluid to and from a reversible fluid utilization device and further to control the volume of flow of fluid to such device to control the speed thereof.

A still further object of my invention is to provide an improved fluid control valve that is uncomplicated and efficient in operation.

These and other objects of my invention will become apparent from a consideration of the appended specification, claims and drawings, in which—

FIG. 4 is an enlarged sectional view of the device of FIG. 2 taken along section line 4—4.

FIG. 5 is an enlarged sectional view of the device shown in FIG. 3 taken along section line 5—5.

FIG. 6 is an enlarged end elevation view of the device shown in FIGS. 1, 2, 3, 4 and 5.

FIG. 7 is a top plan view of a modified control valve embodying the principles of my invention.

FIG. 8 is an enlarged sectional view of the device shown in FIG. 7 taken along section line 8—8.

FIG. 9 is an end elevation view of the device shown in FIG. 7 taken along section line 9—9.

FIG. 10 is an enlarged sectional view of the device shown in FIG. 8 taken along setcion line 10—10.

FIG. 11 is an enlarged fragmentary sectional view of a portion of FIG. 8 taken along section line 11—11.

FIG. 12 is an enlarged fragmentary sectional view of a portion of FIG. 3 taken along section line 12—12.

Figure 1:
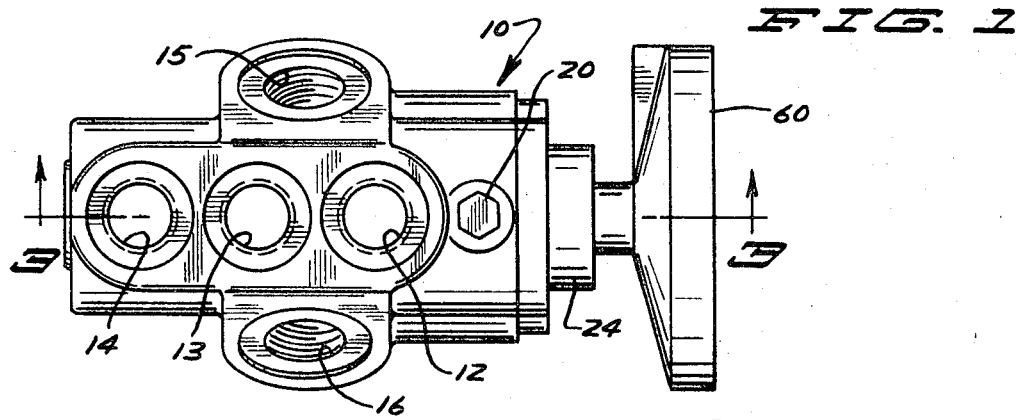
FIG. 1 is a top plan view of a fluid valve incorporating the principles of my invention.
Figure 2:
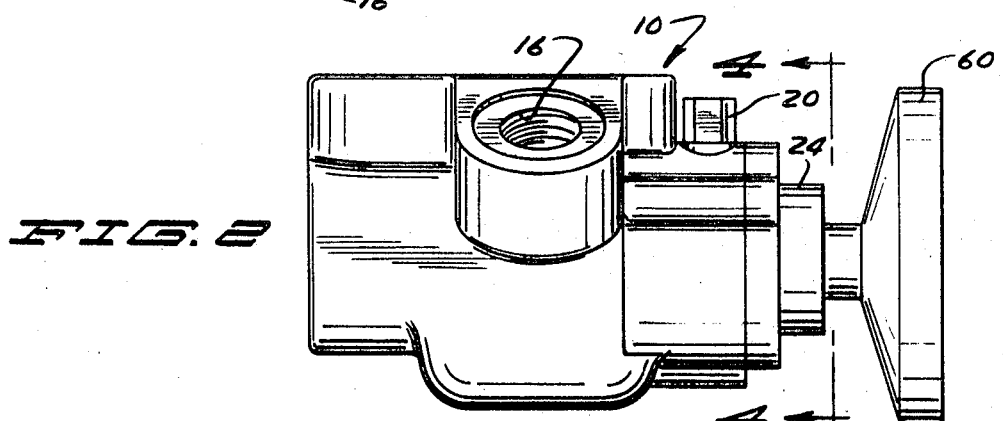
FIG. 2 is a side elevation view of the valve shown in FIG. 1.
Figure 3:
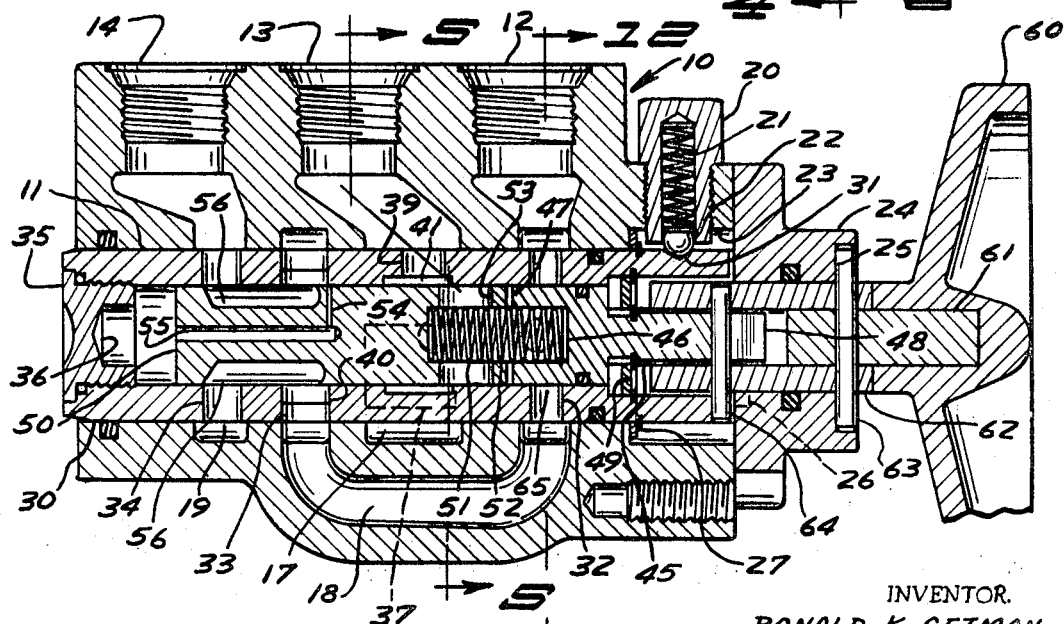
FIG. 3 is an enlarged sectional view of the apparatus of FIG. 1 taken along section line 3—3.

In the embodiment of my invention shown in FIGS. 1–6, inclusive, a valve body 10 is illustrated as having a longitudinally extending bore 11, an inlet port 12, a first tank outlet port 13, a second excess fluid outlet port 14 and a pair of fluid device control ports 15 and 16. Control ports 15 and 16 extend inwardly and in fluid communication with bore 11. Disposed substantially in the same plane and radially outwardly from bore 11 is a further control duct 17 that is shown, as in FIG. 5, extending arcuately approximately one-half of the periphery of the lower portion of bore 11 and centrally upwardly therefrom and is connected to tank outlet port 13 through suitable further duct means as shown in FIG. 3 of the drawings. Inlet port 12 is shown in fluid communication with bore 11 and with an excess fluid duct 18 which extends longitudinally of and parallel to bore 11 through body 10 to a groove disposed around bore 11 intermediate the center and left end of FIG. 3. A further excess fluid duct 19 is shown disposed to the right of the last named groove and is likewise disposed in bore 11 and is in fluid communication with excess fluid outlet port 14 that is adapted for connection to other fluid operated devices, and control elements therefor, in a system embodying a single source of fluid under pressure.

At the top right-hand end of FIG. 3 there is shown a plug member 20 which is suitably threaded into valve body 10 and extends downwardly and inwardly into an enlarged portion 23, at the right of bore 11. A suitable spring 21 and ball detent member 22 are disposed in an axially extending hole provided in plug 20. The right-hand outer end of bore 11 is shown having an end cap 24 which may be held in place with suitable screw threaded members (not shown). End cap 24 has a suitable recess 25, of the general shape shown in FIG. 4 of the drawings, at its right end and a further suitable recess 26 disposed on its left end and for purposes to be explained below.

A first hollow directional control spool member 30 is shown rotatably disposed in bore 11 and is held in place through suitable retainer means 27. Spool member 30 is provided with a plurality of peripherally outwardly opening, radially disposed, detenting recesses 31 at the right end, a plurality of radially extending inlet bores 32 disposed adjacent a duct connected to inlet port 12 and to excess fluid duct 18, a plurality of flow divider bores 33, also extending radially therethrough adjacent the groove in bore 11 connected to the left end of excess flow duct 18, and a plurality of radially extending outlet bores 34 adjacent excess fluid duct 19, in turn connected to excess fluid port 14. A plug member 35 is shown threadedly and sealingly disposed on the left end of spool 30 and includes a centrally disposed inwardly opening recess 36 for purposes to be explained below. A pair of flatted portions 37 and 38 are shown (FIG. 5) at opposed radially spaced portions of the periphery of spool 30 and in substantially the same plane and axially adjacent to motor control duct 17 and outlet port 13, a further radially extending control bore 39 being disposed in fluid communication with the inner portion of spool 30. It may also be noted that an inwardly opening radial groove 40 is disposed adjacent radial bores 33 and a similar radial groove 41 is disposed adjacent control bore 39 and substantially at the same axial position as the flatted portions 37 and 38.

A second rotatable valving spool member 45 is shown rotatably disposed inside the right-hand portion of spool member 30 and is held in place with suitable retaining means 49 which allow for rotation of valving spool member 45 with respect to spool member 30. Spool member 45 is provided with a recess 46 at its left end which is further in fluid communication with the interior of spool member 30 and with radial inlet bores 32 through a like number of radial bores 47. Spool member 45 also includes a slotted portion 48 at its right-hand end.

A pressure responsive flow control spool 50 is shown slidably disposed inside the left end of spool member 30 and is provided with a recess 51 at its right end that includes a plurality of radially extending bores 53 to provide fluid communication with the interior of valve spool member 30 and groove 41. A suitable spring 52 is shown disposed intermediate the recess 46 in spool member 45 and recess 51 in spool member 50 to tend to bias spool member 50 toward the left end of spool member 30. Spool member 50 is also provided with one or more radially extending bores 54 that are in turn connected to an axially extending bore 55 that extends to its left-hand extremity into fluid communication with recess 36 and plug 35 disposed over the left end of spool member 30. Spool 50 is also provided with an outwardly opening, annular, peripheral groove 56 disposed near its left end.

A rotatable control handle 60 is shown disposed on a shaft 61 and is further connected to a hollow shaft 62 by a suitable pin 63. Hollow shaft 62 also carries a further pin member 64 extending therethrough and radially outwardly therefrom for constant engagement with slot 48 in spool member 45 and selective engagement with a suitable slot disposed in the right end of spool member 30.

Under normal operating conditions, the valve illustrated in FIGS. 1–6 is connected through the use of suitable conduits (not shown), such that ports 15 and 16 are connected to the inlet and outlet ports on a reversible fluid utilization device, inlet port 12 is connected to the output of a suitable source of fluid under pressure, outlet port 13 is connected to the sump or return line of the suitable source of fluid under pressure and excess fluid outlet port 14 may be connected to further fluid utilization devices or directly to the sump or return line of the suitable source of fluid under pressure.

With the valve in the position illustrated in the drawings, namely, a neutral position, fluid under pressure will enter inlet port 12, proceed through annular duct 65, excess fluid duct 18, radial ports 33, radial groove 40, radial port 54, longitudinal duct 55 to the chamber defined by recess 36 in plug 35 at the left end of spool 30 to exert a pressure that will cause spool 50 to move toward the right to the position shown in the drawing and it will be maintained in this position by the pressure applied thereto. At this time valve members 30 and 45 are in the position shown in FIG. 12 of the drawings. This provides fluid communication between annular groove 40 and excess fluid outlet port 14 through groove 56 in spool 50, radial ports 34 in spool 30 and excess fluid outlet duct 19 in valve body 10. Flatted portions 37 and 38 and radial bore 39 in spool 30 are in the position shown in FIG. 5 in the drawings. As may be seen in FIG. 5, in this position, spool 30 serves to block the ducts connected to motor control ports 15 and 16 and the fluid utilization device connected thereto is held in a locked position whereat the flow of fluid either to or from the device is effectively blocked by the interposition of the peripheral portion of spool 30 disposed adjacent the ducts formed in valve body 10. It may also be noted that in the neutral or center position of wheel 60, it is in effective engagement with a slot 48 in spool 45 and the notch formed in the right end of spool 30. Spool 30 is held nonrotatable in response to the detenting action of recess 31 and ball detent member 22 under the force of spring member 21. Further, the relative rotational disposition of bores 47 in valve spool 45 and bores 32 in spool 30 is such that fluid communication therebetween is effectively prevented or blocked. With spool 50 in the position shown, all of the fluid flow through the valve assembly from inlet port 12 to excess fluid outlet port 14 which may be connected to other fluid operated devices and controls therefor.

When it is desired to operate a fluid utilization device connected to control ports 15 and 16, control handle 60 is rotated in one direction or the other and during the first portion of rotation, indicated by the letter A, there is no fluid communication intermediate control ports 15 and 16. At or about the point indicated by the letter B, bore 39 in spool 30 is in fluid communication with one of the control ports, 15 or 16, and motor control duct 17 while one of the flatted portions 37 or 38 allows fluid communication between the other of the control ports, 15 or 16, and motor control duct 17 whereby fluid communication intermediate control ports 15 and 16, and thus the fluid utilization device connected thereto, is established and the device is in a "freewheeling" phase of operation.

Continued rotation of control handle 60 to the portion indicated by letter C, results in the alignment of control bore 39 with one or the other of motor control ports 15 and 16 and the connection of the other of the control ports to motor control duct 17 through one or the other of the flatted portions 37 or 38 on spool 30 whereby fluid communication with outlet port 13 is established. At the beginning of this stage of the operation of the valve, fluid is not being supplied nor removed from the fluid utilization device connected to control ports 15 and 16.

It may be noted that the beginning of the range indicated by letter C in the drawings, spool 30 and spool 45 have been rotated in unison to the extent of the limits defined by recess 25 in end cap 24 and pin 63 extending through shaft 61 and hollow shaft 62. At this point, control wheel 60 may be moved outwardly to the right and pin 64 that has been in engagement with the notch in the end of spool 30 and which extends through hollow shaft 62 may be withdrawn into recess 26 at the left end of end cap 24 whereby continued rotation of handle 60 in the same direction causes rotation of spool 45 with respect to spool 30 (which is held nonrotatable by the action of the detenting mechanism including recesses 31 and ball detent 22). As spool 45 is rotated, fluid communication is provided through bores 32 in spool 30 and bores 47 in spool 45 to allow fluid to flow from inlet port 12, to the interior of spool 30, through bores 53 in spool 50 into groove 41 out through bore 39 and spool 30 and into the control port with which it is now in fluid communication. At thhe same time, the reduction in pressure applied to slidable spool 50 through duct 18, radial duct 54 and axial duct 55 allows spool 50 to move to the left under the action of spring 52 whereby adequate operating pressures and volume are maintained in duct 18 so that the fluid will flow in the manner just described to one or the other of the control ports as necessary and in volume determined by the relative angular positions of spool 30 and spool 45. Simultaneously, fluid may flow from the other of the control ports to outlet port 13 through duct 17. When it is desired to stop or reverse the fluid utilization device connected to the valve, the handle 60 is rotated in the opposite direction and will proceed from the driving speed control mode, through the freewheeling mode to the locking mode and thence to a freewheeling mode and a speed controlling mode in the opposite direction so that the fluid utilization device must be stopped before it can be supplied with fluid that will cause reverse operation.

Referring now to FIGS. 7–12, a second embodiment of my invention in a fluid valve is shown as comprising a valve body 70 having a bore 71, inlet and outlet ports 72 and 73, an excess fluid outlet port 74 and a pair of motor control ports 75 and 76. Inlet port 72 is shown connected to a suitable duct 78 that in turn is connected to axially spaced annular grooves 88 and 89 that are disposed annually around bore 71. Bore 71 is enlarged at its right end, as indicated by reference character 83, and extending through a suitable threaded aperture into enlarged portion 83 is a ball detent 82 that is slidably disposed in a suiable plug 80 which also contains a suitable biasing means shown in the form of spring 81. An end cap 84 having siutable slots 85 and 86 is fixedly attached through suitable fastening means to the end of body 70.

A first hollow spool member 90 is shown rotatably disposed in bore 71 and includes suitable angularly spaced detenting recesses 91, a plurality of inlet bores 92, a plurality of outlet bores 93, a plurality of flow divider bores 95, an outlet groove 94, a flow divider groove 96, a pair of flatted valving portions 97 and 98 and a radially extending control bore portion 99. A suitable plug 100 having an internal recess 101 is disposed in sealing relationship with the left end of valve spool 90. Valve spool 90 is held in bore 71 through retainer device 102 at its left end and retainer device 87 at its right end.

A second valving spool member 105 is shown having a recess 106, a plurality of radial bores extending into said recess 106, and a flatted portion 108 on the right end. Spool 105 is rotatably disposed within spool 90 and is held in place by a suitable retainer device 109.

A third pressure responsive flow control spool 110 is slidably disposed in the left end of spool 90 and includes a recess at its right end to receive a spring 112 interposed intermediate spool 110 and recess 106 in spool 105. A plurality of radial bores 113 provide fluid communication from recess 111 to groove 94 in spool 90. A further radial bore 114 extends into fluid communication with an axial bore 115 which extends axially to the left end of spool 110 in fluid communication with recess 101 in plug 100. An outwardly opening, peripheral, annular groove 116 is disposed adjacent the flatted portions 78 and 79 and control bore 99 in spool 90.

A control handle 120 is shown to rotate a hollow shaft member 121 which is provided with a pair of transversely extending pin members 122 and 123 whereby hollow shaft member 121 is nonrotatably and slidably disposed on the right end of spool 105 and further includes a flatted portion at the periphery of its right end for engagement with a further transverse pin 124 that extends transversely through the interior of the recess at the right end of spool 90.

With the apparatus of FIGS. 7–12 in the position shown in the drawings, and with ports 75 and 76 connected to a suitable fluid utilization device and inlet port 72 connected to a suitable source of fluid under pressure, fluid will flow into inlet port 72, into duct 78, through bores 92 in spool 90, bores 107 in spool 105, the center portion of spool 90, bores 113 in spool 110, groove 94 on spool 90, bores 93 in spool 90 and into duct 79 connected to excess fluid port 73 by suitable passageways (not shown). It may be noted from a consideration of FIG. 10 that there is no fluid communication to or from either of control ports 75 or 76 in a manner similar to that described in connection with the embodiment shown in FIGS. 1–6. It should also be noted that control handle 120 is in effective engagement with rotatable spool members 90 and 105 to simultaneously rotate the same. When it is desired to operate a fluid utilization device connected to control ports 75 and 76, handle 120 is rotated in one direction or the other and for the first angular portion of rotation indicated by reference letter A, the fluid utilization device remains effectively locked. As the rotation proceeds through the angular distance indicated by letter B, fluid communication is established between one or the other of the ports and bore 99 which is connected to duct 77 and the other port is connected to duct 77 by one or the other of the flatted portions 97 or 98 on spool 90 to allow "freewheeling" of the fluid utilization device. Further movement of handle 120 provides alignment of axial bore 79 with one or the other of control ports 75 or 76 and simultaneously connects the other of the control ports to duct 77 and thus to outlet port 73 by the cooperation of one or the other of flatted portions 97 or 98 with the other of the control ports. This angular movement is indicated by letter C in FIG. 9. At this point, control handle 120 and hollow shaft 121 may be moved outwardly into slot 85 or 86 on end cap 84. This disengages the driving connection with spool 90 through pin 124 and spool 90 is retained in this position by the detent arrangement including ball 82 and a suitably disposed recess 91. Continued rotation of handle 120 causes rotation of spool 105 with respect to spool 90 to tend to cut off fluid communication through bores 92 and 108. This causes a build-up of pressure in duct 78 and fluid is applied through bore 114, bore 115 to the recess at the right end of slidable spool 110 which causes it to move to the right against a biasing force supplied by spring 112 to connect groove 116 to groove 110 in spool 90. This allows fluid to flow into duct 79, out through the control port to which it is connected and to the fluid utilization device.

It may thus be seen that in both of the illustrated embodiments of my invention, a first directional control spool is rotatably disposed in cooperable relationship with suitable ducts and ports in a valve body, a second flow control spool is rotatably cooperably disposed in the first directional control spool and suitable cooperable driving means are utilized to provide control of direction and rate of flow of fluid through the valve body. Further spool means are cooperably and slidably disposed within the first directional control spool to control the volume of fluid supplied to a control device in accordance with the relative angular position of the second flow control spool with respect to the first directional control spool.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. Rotary fluid controlling apparatus comprising in combination;
    (a) a valve body including a bore, inlet and outlet ports and duct means interconnecting said bore with said ports;
    (b) a first hollow spool member rotatably disposed in said bore and including a plurality of duct means disposed to provide fluid communication interiorly thereof with said inlet and outlet ports and to selectively provide fluid communication interiorly thereof with said control ports;
    (c) a second spool member disposed within said first spool member and operable in response to relative rotation therebetween to control the flow of fluid from said inlet port to the interior of said first spool member;
    (d) further pressure responsive flow control means slidably disposed concentrically within said first spool member for controlling the flow of fluid from the interior thereof to said outlet port in response to the relative angular disposition of said first and second spool members; and
    (e) selective control means operative in a first mode to simultaneously rotate said first and second spool members and in a second mode to rotate said second spool member relative to said first spool member.

2. The apparatus of claim 1 in which the valve body includes at least two outlet ports and the pressure responsive flow control means is operative to provide fluid flow from the inlet to one of said outlet ports when the first and second spool members are in the first mode of operation and to provide fluid pressure to the control ports and the other of said outlet ports when the first and second spool members are in the second mode of operation.

3. The apparatus of claim 2 in which the selective control means is in continuous engagement with the second spool and is selectively engageable with the first spool when the first and second spool members are in a predetermined angular relationship.

4. The apparatus of claim 2 in which the first spool includes a radial port and first and second annular outwardly opening grooves and the valve body includes angularly spaced control ports, a duct and a further annular groove connected to the other of the outlet ports.

5. The apparatus of claim 2 in which the valve body includes means operable to releasably engage the first spool member in at least two angular positions.

6. The apparatus of claim 2 in which the second spool member is operative to supply fluid from the inlet port to the pressure responsive flow control means when said first and second spool members are operative in the first mode of operation.

7. The apparatus of claim 2 in which the second spool member is operative to supply fluid from the inlet port to the pressure responsive flow control spool when said first and second spool members are operative in the second mode of operation.

8. The apparatus of claim 1 in which the selective control means is operative in the first mode of operation when the spool members are in a predetermined angular relationship.

9. The apparatus of claim 2 in which the selective control means is operative in the first mode of operation when the spool members are in a predetermined angular relationship.

10. The apparatus of claim 3 in which the selective control means is operative in the first mode of operation when the spool members are in a predetermined angular relationship.

References Cited

UNITED STATES PATENTS

| | | | |
|---|---|---|---|
| 2,682,715 | 7/1954 | Walby | 137—636.4 X |
| 2,977,983 | 4/1961 | Headings | 137—636.4 X |

CLARENCE R. GORDON, Primary Examiner